3,704,089
PROCESS FOR THE STERILIZATION OF MEDICINAL TISSUE-BINDING SUBSTANCES

Gerhard Stehlik, Leithaprodersdorf, Austria, assignor to Osterreichische Studiengesellschaft fur Atomenergie G.m.b.H., Vienna, Austria
No Drawing. Filed Nov. 12, 1970, Ser. No. 89,117
Claims priority, application Austria, Nov. 17, 1969, 10,742/69
Int. Cl. A61l 13/00
U.S. Cl. 21—54 R           6 Claims

ABSTRACT OF THE DISCLOSURE

In a process for the sterilization of medicinal tissue-binding substances based on monomeric or oligomeric esters of cyano-acrylic acids, the sterilization being carried out by ionizing irradiation, e.g., gamma irradiation, after the esters have been cooled preferably to below their solidification points.

---

The invention concerns a process of sterilization or germination-inhibition by means of ionizing irradiation of monomeric or oligomeric compounds in their solid state, so that polymerization of these compounds is prevented, the monomeric compounds used being the monomeric esters of α-cyano-acrylic acid having the formula

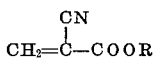

wherein R signifies an alkyl group having 1–16 atoms of carbon, a substituted alkyl group such as an alkoxyalkyl, acyloxyalkyl or halo-alkyl group, a cyclohexyl, phenyl or alkenyl group having 2–16 atoms of carbon, or monomeric esters of methylene malonic acid having the formula:

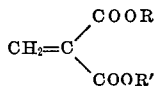

wherein R and R' signify the same or differing straight-chain or branched-chain alkyl group having 1–18 atoms of carbon or a halo-alkyl-aryl-cyclohexyl or phenyl group which are stabilized with 0.001 to 0.1 percent by weight of a gaseous acid inhibitor of the Lewis type, acids such as sulphur dioxide, nitrogen oxide, boron trifluoride and hydrogen fluoride, and with 0.01 to 0.5% by weight of a phenolic polymerization inhibitor of the free radical type such as hydroquinone, trimethylhydroquinone, hydroquinone monomethylether, butylized hydroxyanisol, pyrogallol, 1,1-di-2-naphthol, 2,6-di-tert-butyl-p-cresol, and preferably with a mixture of sulphur dioxide and hydroquinone for example n-butyl-α-cyano-acrylate or dimethylene malonate which are stabilized with 0.01% of sulphur dioxide and 0.01% by weight of hydroquinone.

These tissue-binding substances have proved particularly suitable for surgical purposes, but can be used for these purposes only in the completely sterile form (also free from bacterial spores such as tetanus and gas gangrene). Since these monomeric compounds polymerize very readily, the normal processes such as steam-sterilization, heat-sterilization, gas treatment, sterile filtration and ionizing irradiation at room temperature are completely useless. Within a very short period, each of them leads to polymerized solid compounds which are completely unsuitable as adhesives.

The object of the invention therefore is to provide a process in which the required sterility is achieved by ionizing irradiation without initiating premature polymerization or causing disadvantageous bonding properties. Furthermore, the process should not result in reduced stability within a period of at least one year. Additionally the step of sterilization should be carried out only after the adhesive is packed ready for dispatch so as safely to exclude secondary infections.

The crux of the process resides in complete inactivation of the bacterial spores.

According to the invention, it is now proposed that sterilization or inhibition of germination be carried out by ionizing irradiation after the esters have been cooled, preferably to below their solidification points.

The bacterial spores are killed off by means of ionizing irradiation, it not having been possible to detect any such spores after a Co 60-gamma irradiation dose of 1.5 mrad., for instance. It has been found that sterilization by ionizing irradiation of the adhesive in its liquid form damages this to an extent that it becomes unusable. Only when the pure or coloured adhesive is irradiated at temperatures that ensure that it remains in the solid condition is it possible to prevent all damage to the substance both as regards its surgical usefulness and its viscosity, adhesive properties and stability, the temperatures employed being —30° C. and below.

The adhesive can however also be treated by normal methods of germination-inhibition, and the process of the invention can then be used to render the substance completely free of germs. In this case, smaller irradiation doses and higher temperatures can be used. The same applies also in cases where the adhesive does not need to be completely germ-free; then the temperatures do not necessarily require to be below that of the solidification point.

Apart from anthraquinones and diazines, dyestuffs of the following types can also be used: azo dyestuffs, cyanine dyestuffs, triarylmethane dyestuffs etc.

The term "germs" used in this specification will be understood to cover bacteria, spores, bacilli, fungi, and so forth.

The cooling can be carried out by means of liquid air, liquid nitrogen, liquid oxygen, liquid hydrogen, or liquid helium.

EXAMPLE I 0.5 g. of a monomeric ester of α-cyano-acrylic acid having the formula:

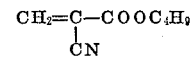

was cooled to —196° C. in a glass ampoule, the substance solidifying completely at this temperature. At the same temperature it was subjected to Co 60 irradiation treatment, the dose being 2.4 mrad. After slow melting of the preparation, it was found to possess the same viscosity and the same adhesive properties as prior to its irradiation.

EXAMPLE II

An adhesive substance as described in Example I but coloured with an anthraquinone dyestuff (Vaxoline Purple AS) was subjected to Co 60-gamma irradiation at —80° C., the dosage being 1.5 mrad. After melting, the adhesive exhibited an increase in viscosity of 10%, its other properties remaining unchanged.

EXAMPLE III

An adhesive substance as described in Example I was exposed to a 0.2 mrad gamma-ray dosage at room temperature, and became completely polymerized.

EXAMPLE IV 1.0 g. of a monomeric diester of methylene malonic acid having the formula:

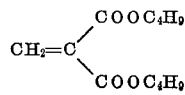

and coloured with a diazine dyestuff (Colour Index, Part I, No. 102) was cooled to minus 183° C. in a polyethylene film and subjected to β-radiation. After the adhesive had softened, no changes in its properties were observed.

What is claimed is:

1. A process for the sterilization of, or inhibition of germination in, medicinal tissue-binding substances based on monomeric or oligomeric esters the monomeric diesters of methylene malonic acid having the general formula:

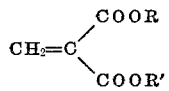

in which R and R' signify the same or a different straight-chain or branched-chain alkyl group having 1–18 atoms of carbon or a halo-alkyl, aryl, cyclohexyl or phenyl group, or on monomeric or oligomeric esters of α-cyanoacrylic acid having the general formula:

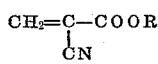

in which R is a straight or branched-chain alkyl group having 1–16 atoms of carbon or a substituted alkyl group such as an alkoxyalkyl, acyloxyalkyl or halo-alkyl group, a cyclohexyl, phenyl or an alkenyl groups, colourless or coloured by the addition of dyestuffs such as anthraquinones or diazynes, wherein the sterilization or germination-inhibition is carried out by ionizing gamma or beta irradiation after the esters have been cooled to below their solidification points.

2. A process according to claim 1, wherein cooling is to below —30° C.

3. A process according to claim 1 wherein cooling is carried out by means of liquid air or its constituents.

4. A process, as set forth in claim 1, wherein cooling is carried out by means of liquid hydrogen.

5. A process for the sterilization of, or inhibition of germination in, medicinal tissue-binding substances based on monomeric or oligomeric esters, the monomeric diesters of methylene malonic acid having the general formula:

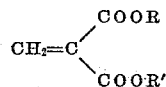

in which R and R' signify the same or a different straight-chain or branched-chain alkyl group having 1–18 atoms of carbon or a halo-alkyl, aryl, cyclohexyl or phenyl group, or on monomeric or oligomeric esters of α-cyanoacrylic acid having the general formula:

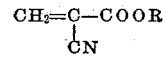

in which R is a straight or branched-chain alkyl group having 1–16 atoms of carbon or a substituted alkyl group such as an alkoxyalkyl, acyloxyalkyl or halo-alkyl group, a cyclohexyl, phenyl or an alkenyl group colourless or coloured by the addition of dyestuffs such as anthraquinones or diazines, wherein the sterilization or germination-inhibition is carried out by ionizing gamma or beta irradiation after the esters have been cooled to below their solidification points.

6. A process according to claim 5, wherein the ionizing irradiation employed is Co 60-gamma irradiation.

References Cited

UNITED STATES PATENTS

| | | | |
|---|---|---|---|
| 3,197,640 | 7/1965 | Speas | 21—54 R X |
| 3,281,332 | 10/1966 | Munns | 21—54 R X |
| 3,537,967 | 11/1970 | Kelley | 250—106 R X |
| 3,360,124 | 12/1967 | Stonehill | 206—84 |
| 3,524,537 | 8/1970 | Winter | 128—334 R X |
| 3,523,097 | 8/1970 | Coover et al. | 260—485 R X |

MORRIS O. WOLK, Primary Examiner

D. G. MILLMAN, Assistant Examiner

U.S. Cl. X.R.

128—334; 250—106 R